United States Patent
Iizuka

(10) Patent No.: US 9,401,964 B2
(45) Date of Patent: Jul. 26, 2016

(54) INFORMATION CONVEYANCE EFFECT MEASURING SYSTEM, INFORMATION CONVEYANCE EFFECT MEASURING METHOD, DETERMINATION DEVICE, DETERMINATION METHOD, AND RECORDING MEDIUM

(71) Applicant: CASIO COMPUTER CO., LTD., Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 565 days.

(21) Appl. No.: 13/631,029

(22) Filed: Sep. 28, 2012

(65) Prior Publication Data

US 2013/0083313 A1    Apr. 4, 2013

(30) Foreign Application Priority Data

Sep. 30, 2011    (JP) .................................. 2011-217989

(51) Int. Cl.
*G01N 21/00* (2006.01)
*G06Q 30/00* (2012.01)
(Continued)

(52) U.S. Cl.
CPC ............. *H04L 67/20* (2013.01); *G06Q 30/0241* (2013.01); *H04L 67/18* (2013.01); *H04W 4/206* (2013.01); *H04M 1/7253* (2013.01)

(58) Field of Classification Search
CPC ....... H04L 67/20; H04L 1/7253; H04L 67/18; H04W 4/206; G06Q 30/0241; G06Q 30/0261; G06Q 30/0242; G06Q 30/0269; G06Q 30/0244; G06Q 30/0271; G06Q 30/0255; G06Q 30/0251; H04N 21/812; H04N 21/44218; G06F 17/30867; H04M 1/7253

USPC ........................ 356/72; 725/12; 705/14.26–28
See application file for complete search history.

(56) References Cited

U.S. PATENT DOCUMENTS

| | | | |
|---|---|---|---|
| 7,308,194 B2 | 12/2007 | Iizuka et al. | |
| 2008/0140479 A1* | 6/2008 | Mello et al. | ........................ 705/7 |
| 2012/0262487 A1* | 10/2012 | Huebner | ........................ 345/634 |

FOREIGN PATENT DOCUMENTS

| | | | |
|---|---|---|---|
| JP | 2004333952 A | 11/2004 |
| JP | 2006020294 A | 1/2006 |
| JP | 2010-146282 A | 7/2010 |

OTHER PUBLICATIONS

Japanese Office Action (and English translation thereof) dated Jul. 21, 2015, issued in counterpart Japanese Application No. 2011-217989.

*Primary Examiner* — Tarifur Chowdhury
*Assistant Examiner* — Sunghee Y Gray
(74) *Attorney, Agent, or Firm* — Holtz, Holtz & Volek PC

(57) ABSTRACT

An advertisement display device displays an outdoor advertising image and emits light (advertisement ID light) modulated in accordance with the advertisement ID and having the luminance changed temporally in the same direction as the display direction of the outdoor advertising image. Receiving the advertisement ID light, a portable terminal demodulates and decodes it to acquire the advertisement ID and sends advertisement recognition information including the advertisement ID, time, location of the portable terminal, direction from the portable terminal to the advertisement display device, and terminal ID to a server. The server aggregates the advertisement recognition information for each advertisement and for each time window and creates advertising effect information.

8 Claims, 4 Drawing Sheets

(51) Int. Cl.
*H04K 1/10* (2006.01)
*H04L 29/08* (2006.01)
*H04W 4/20* (2009.01)
*G06Q 30/02* (2012.01)
*H04M 1/725* (2006.01)

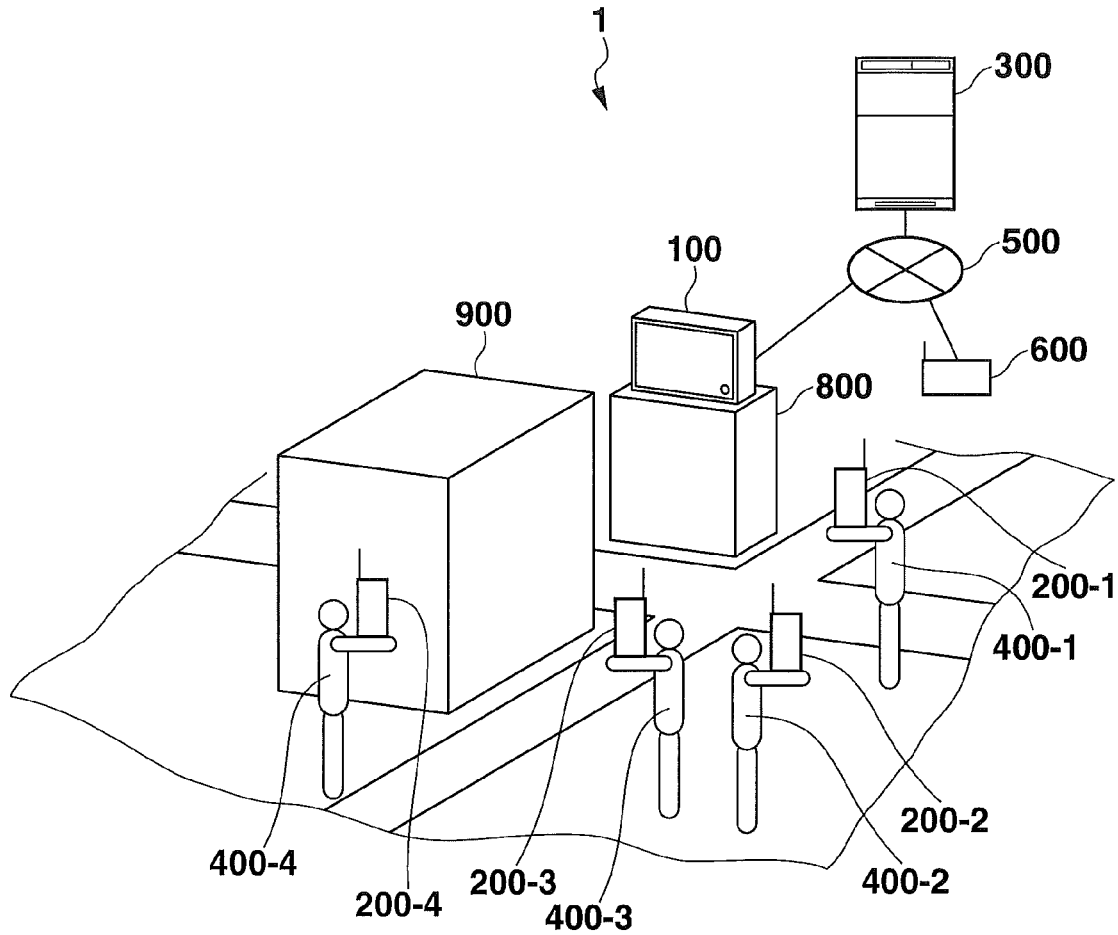
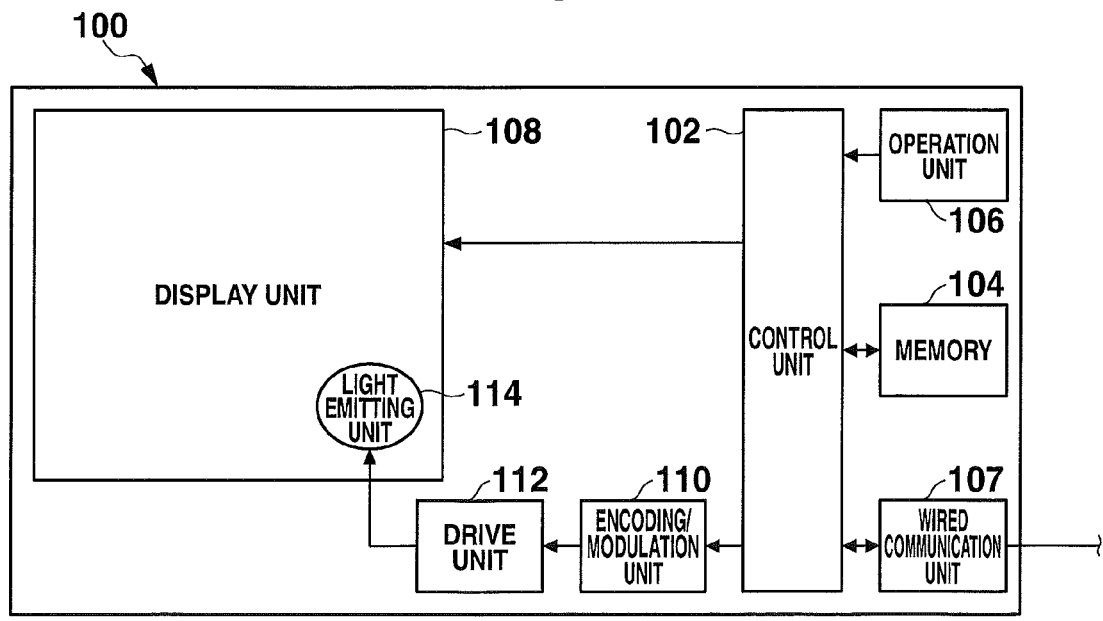

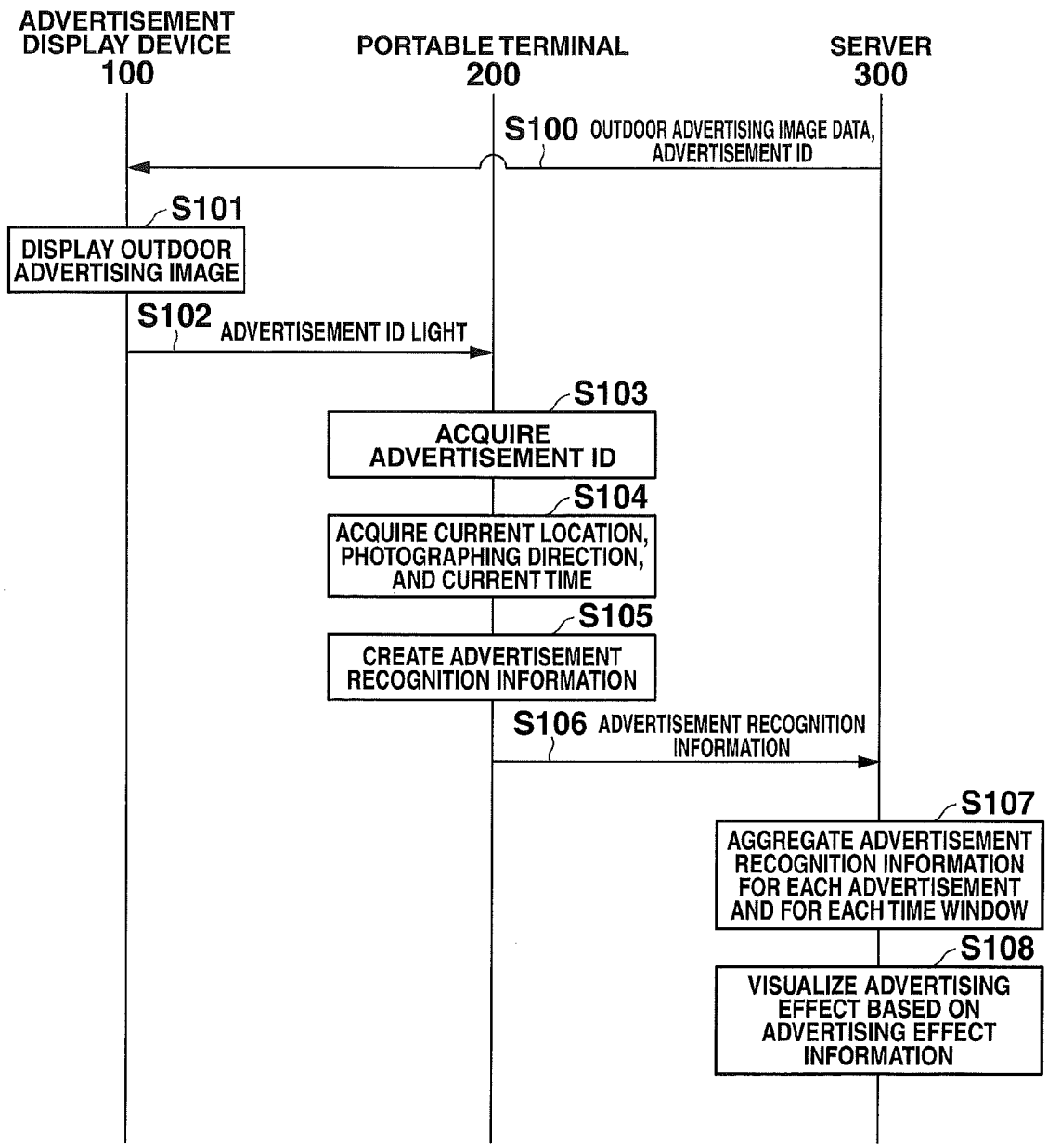
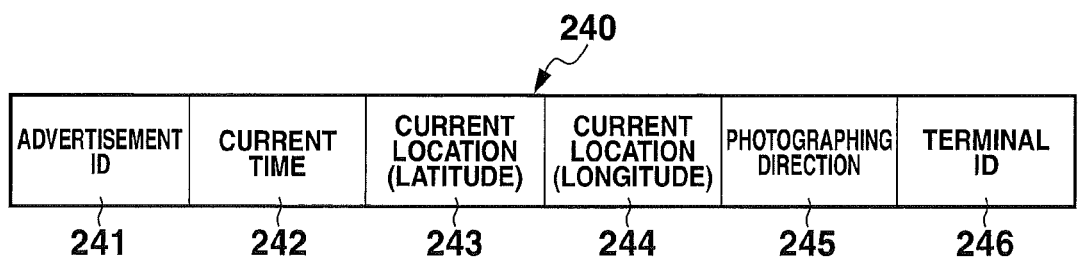

| ADVERTISEMENT ID: 123456 | | | | |
|---|---|---|---|---|
| TIME: 9:00-12:00 | | | | |
| TIME OF ACQUISITION (CURRENT TIME) | LATITUDE | LONGITUDE | PHOTOGRAPHING DIRECTION (0 DEGREE = N) | TERMINAL ID |
| 9:01 | 139.11 | 40.12 | 50 | 32109876 |
| 9:04 | 139.12 | 40.11 | 40 | 76779739 |
| ⋮ | | | | |

INFORMATION CONVEYANCE EFFECT MEASURING SYSTEM, INFORMATION CONVEYANCE EFFECT MEASURING METHOD, DETERMINATION DEVICE, DETERMINATION METHOD, AND RECORDING MEDIUM

CROSS-REFERENCE TO RELATED APPLICATION

This application claims the benefit of Japanese Patent Application No. 2011-217989, filed on Sep. 30, 2011, the entire disclosure of which is incorporated by reference herein.

FIELD

This application relates to an information conveyance effect measuring system, an information conveyance effect measuring method, a determination device, a determination method, and a recording medium used for analyzing information conveyance effects such as advertising effects of display-type advertising media.

BACKGROUND

Information to be conveyed to the general public includes advertising information.

The sender of advertising information is desirous of analyzing and knowing the effect of the advertising information, namely how many people saw the advertising information.

Indicators of the effect of advertisement displayed outdoor (outdoor advertisement) include the number of observers, attributes associated with the location where the advertising information is placed and the contents of advertising information.

For example, the advertising effect measuring device, described in Unexamined Japanese Patent Application Kokai Publication No. 2010-146282, captures images around the advertising information, detects the faces of observers in the images, and identifies the attributes of the people who saw the advertising medium such as the gender and age group.

The advertising effect is sometimes measured as follows.

For example, a RFID (radio frequency identification) tag or QR (registered trademark) code may be posted along with the advertisement. In these cases, the terminal device carried by the observer receives information stored in the RFID tag or reads the QR code to acquire the information on the QR code. Then, the terminal device sent the information to the server. The server counts the number of accesses from the terminal devices to measure the effect of the placement of the advertising information.

There are various kinds of advertising information, some intended for observers present within several meters and some intended for observers present within several hundred meters.

The advertising effect measuring device described in the above literature measures the effect on observers in the immediate vicinity. However, it is difficult to measure the effect on the observers present in a wide range.

Furthermore, in the case of using a RFID tag or QR code as described above, the observers rarely come close to the advertising information and receive the RFID tag or read the QR code.

As described above, it is difficult to measure the effect on the observers present in a wide range.

SUMMARY

An exemplary object of the present invention is to make it possible to properly measure the conveyance effect of visual information regardless of the targeted range.

In order to achieve the above object, the information conveyance effect measuring system according to the present invention is an information conveyance effect measuring system including a visual information conveyance device, a terminal device, and a determination device determining the conveyance effect of visual information, wherein: the visual information conveyance device comprises: a display displaying the visual information; and a light emitter emitting light modulated in accordance with identification information of the visual information, the terminal device comprises: a light receiver receiving light from the light emitter; a location detector detecting the location of the terminal device when the light receiver receives the light; and a transmitter transmitting the identification information obtained by demodulating the light and location information of the terminal device detected by the location detector to the determination device, and the determination device comprises: an information receiver receiving the identification information and location information transmitted by the transmitter; and a determiner determining the transmission range of the visual information based on the identification information and location information received by the information receiver.

In order to achieve the above object, the information conveyance effect measuring method according to the present invention is an information conveyance effect measuring method in a system including a visual information conveyance device, a terminal device and a determination device determining the conveyance effect of visual information, including: a step in which the visual information conveyance device displays the visual information; a step in which the visual information conveyance device emits light modulated in accordance with identification information of the visual information; a step in which the terminal device receives light from the visual information conveyance device; a step in which the terminal device detects the location of the terminal device when the light is received; a step in which the terminal device transmits the identification information obtained by demodulating the light and location information of the terminal device to the determination device; a step in which the determination device receives the identification information and location information from the terminal device; and a step in which the determination device determines the transmission range of the visual information based on the received identification information and location information.

In order to achieve the above object, the determination device according to the present invention is a determination device determining the conveyance effect of visual information and constituting an information conveyance effect measuring system including: a visual information conveyance device comprising a display displaying the visual information and a light emitter emitting light modulated in accordance with identification information of the visual information; and a terminal device comprising a light receiver receiving light from the light emitter and a location detector detecting the present location of the self when the light receiver receives the light, and transmitting the identification information obtained by demodulating the light and the detected present location of the self, comprising: a information receiver receiving the identification information and present location of the terminal device transmitted from the terminal device; and a determiner determining the transmission range of the visual information based on the identification information and present location received by the information receiver.

In order to achieve the above object, the determination method according to the present invention is a determination method determining the conveyance effect of visual information in an information conveyance effect measuring system including: a visual information conveyance device comprising a display displaying the visual information and a light emitter emitting light modulated in accordance with identification information of the visual information; and a terminal device comprising a light receiver receiving light from the light emitter and a location detector detecting the present location of the self when the light receiver receives light, and transmitting the identification information obtained by demodulating the light and the detected present location of the self, comprising: a reception step of receiving the identification information and present location of the terminal device transmitted from the terminal device; and a determination step of determining the attained range of the visual information based on the identification information and present location received in the reception step.

In order to achieve the above object, the computer-readable nonvolatile recording medium according to the present invention is a computer-readable nonvolatile recording medium recording a program allowing a computer to execute a process to determine the conveyance effect of visual information in an information conveyance effect measuring system including: a visual information conveyance device comprising a display displaying the visual information and a light emitter emitting light modulated in accordance with identification information of the visual information; and a terminal device comprising a light receiver receiving light from the light emitter and a location detector detecting the present location of the self when the light receiver receives light, and transmitting the identification information obtained by demodulating the light and the detected present location of the self, recording a program executing: a information receiver receiving the identification information and present location of the terminal device transmitted from the terminal device; and a determiner determining the transmission range of the visual information based on the identification information and present location received by the information receiver.

BRIEF DESCRIPTION OF THE DRAWINGS

A more complete understanding of this application can be obtained when the following detailed description is considered in conjunction with the following drawings, in which:

FIG. 1 is an illustration showing an exemplary arrangement of an advertisement display device, portable terminals, and a server constituting an advertising effect measuring system according to an embodiment of the present invention;

FIG. 2 is an illustration showing an exemplary configuration of the advertisement display device according to the embodiment of the present invention;

FIG. 5 is a flowchart showing an exemplary operation of the advertising effect measuring system according to the embodiment of the present invention;

FIG. 6 is an illustration showing exemplary advertisement recognition information according to the embodiment of the present invention;

DETAILED DESCRIPTION

Figure 3:
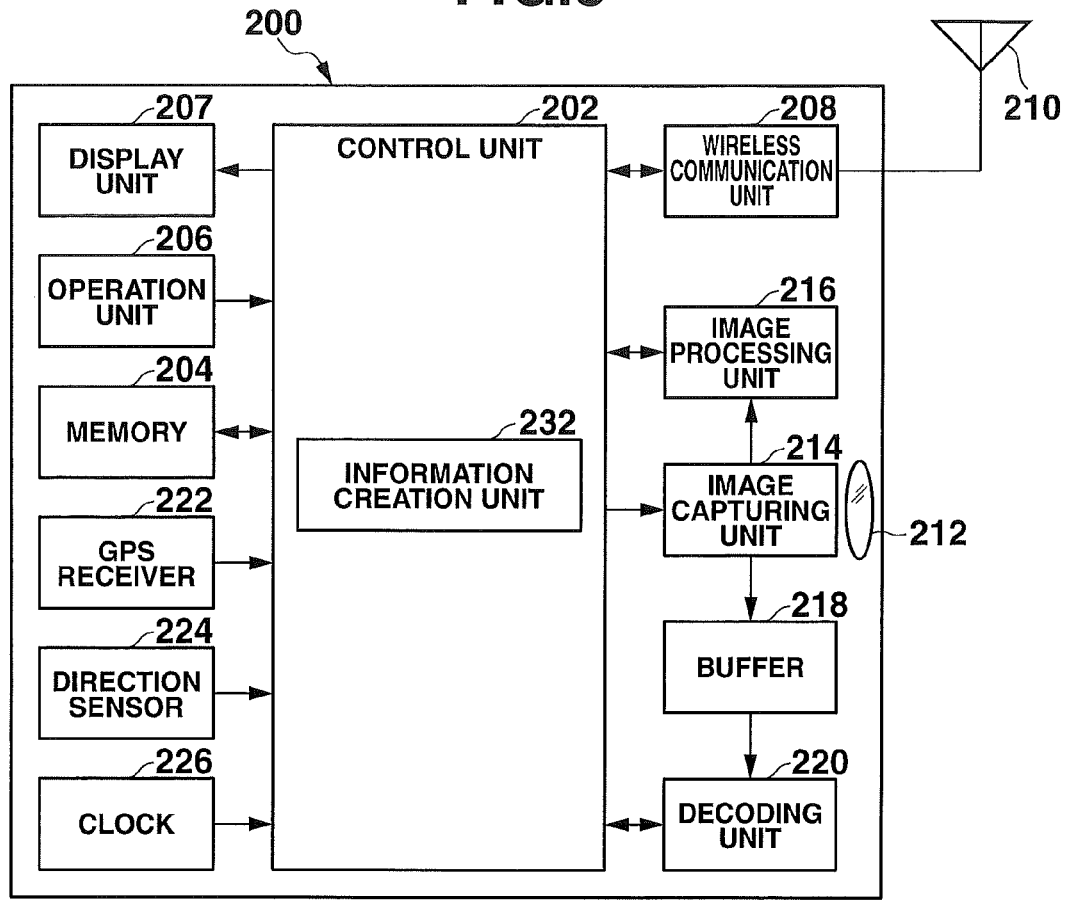
FIG. 3 is an illustration showing an exemplary configuration of the portable terminal according to the embodiment of the present invention.

The advertising effect measuring system and advertising effect measuring method according to an embodiment of the present invention will be described hereafter with reference to the drawings.

As shown in FIG. 1, an advertising effect measuring system 1 is configured to include an advertisement display device 100, portable terminals 200-1 to 200-4 (the portable terminals 200-1 to 200-4 will not be distinguished from each other hereafter and termed a "portable terminal 200" as appropriate), and a server 300.

The advertisement display device 100 displays an outdoor advertising image to the outdoors where there are passers-by (corresponding to the aforementioned observers) 400-1 to 400-4 and buildings 800 and 900.

In this embodiment, the advertisement display device 100 is placed on the roof of the building 800. The portable terminals 200 are a portable terminal with wireless communication function such as a cell-phone, smart-phone, tablet-type personal computer, and note-type personal computer.

The portable terminal 200-1 is carried by the passer-by 400-1, portable terminal 200-2 is carried by the passer-by 400-2, portable terminal 200-3 is carried by the passer-by 400-3, and portable terminal 200-4 is carried by the passer-by 400-4, The server 300 measures the advertising effect of the outdoor advertising image displayed by the advertisement display device 100.

In this embodiment, the advertising effect presents where and how many people saw the outdoor advertisement.

In order words, the advertising effect presents the conveyance (transmission) range of the outdoor advertising image.

The server 300 can communicate with the advertisement display device 100 via a communication network 500.

Furthermore, the server 300 can communicate with the portable terminals 200 via the communication network 500 and a wireless base station 600.

Detailed configuration of the advertisement display device 100 will be described hereafter. As shown in FIG. 2, the advertisement display device 100 includes a control unit 102, a memory 104, an operation unit 106, a wired communication unit 107, a display unit 108, an encoding/modulation unit 110, a drive unit 112, and a light emitting unit 114.

The control unit 102 is composed of, for example, a CPU (central processing unit).

The control unit 102 controls various functions of the advertisement display device 100 by executing software procedures according to programs (for example, a program for realizing the operation of the advertisement display device 100 shown in FIG. 5) stored in the memory 104.

The memory 104 is, for example, a RAM (random access memory) and/or a ROM (read only memory).

The memory 104 stores various kinds of information (programs and the like) used for controlling the function of the advertisement display device 100.

The operation unit 106 is composed of a numeric keypad and function keys, and serves as an interface for input of operation contents from the passers-by 400.

The wired communication unit 107 is, for example, a LAN (local area network) card. The wired communication unit 107 communicates with the server 300 via the communication network 500.

The display unit 108 is composed of, for example, an LED (light emitting diode) display.

The display unit 108 displays images (outdoor advertising images) according to image signals output from the control unit 102.

In this embodiment, the outdoor advertising image provides information that beneficial information from which the passers-by 400 will have some benefit such as service discount coupon information is transmitted.

Here, the beneficial information can be acquired by various methods.

For example, the light emitting unit 114 described later emits light changing the luminance temporally in accordance with the beneficial information and the portable terminal 200 demodulates and decodes the received light to acquire the beneficial information.

Alternatively, the portable terminal 200 can receive the beneficial information sent from the server 300. In such a case, the server 300 sends the beneficial information to the portable terminal 200 in response to the portable terminal 200 sending advertisement recognition information described later to the server 300.

The encoding/modulation unit 110 encodes data output from the control unit 102 to a bit data string.

Furthermore, the encoding/modulation unit 110 conducts digital modulation based on the bit data string.

Any encoding scheme and modulation scheme can be used. A desirable modulation scheme is 4PPM (pulse position modulation) using a subcarrier, having a frequency of 28.8 (kHz).

The drive unit 112 generates drive signals corresponding to the signals output from the encoding/modulation unit 110 and used for temporally changing the luminance of light emitted by the light emitting unit 114.

The drive signals prompt the luminance to rise to a first given value or higher at the time corresponding to a bit "1" and to drop to a second given value or lower at the time corresponding to a bit "0" (here, the second given value<the first given value). The drive unit 112 sends the drive signals to the light emitting unit 114 so that the light emitting unit 114 emits pulsed light that is at a high level at the time of a bit "1" and at a low level at the time of a bit "0."

The light emitting unit 114 is provided in a partial area of the display unit 108.

The light emitting unit 114 emits light (pulsed light) changing the luminance temporally between the higher level (the first given value or higher) and the lower level (second given value or lower) in accordance with the drive signals output from the drive unit 112.

The direction in which the light emitting unit 114 emits light coincides with the direction in which the display unit 108 displays the outdoor advertising image.

In other words, the direction of the optical axis of a not-shown lens constituting the light emitting unit 114 coincides with the direction of a line perpendicular to the outdoor advertising image display surface of the display unit 108.

In this way, the viewable range of the outdoor advertising image and the transition (attained) range of light emitted by the light emitting unit 114 (practical range which the light can transmit the information) are equal.

In other words, if the outdoor advertising image is located within the observable distance range of the portable terminal 200, the portable terminal 200 can receive light emitted by the light emitting unit 114.

Detailed configuration of the portable terminal 200 will be described hereafter.

As shown in FIG. 3, the portable terminal 200 includes a control unit 202, a memory 204, an operation unit 206, a display unit 207, a wireless communication unit 208, an antenna 210, a lens 212, an image capturing unit 214, an image processing unit 216, a buffer 218, a decoding unit 220, a GPS (global positioning system) receiver 222, a direction sensor 224, and a clock 226.

The control unit 202 is composed of, for example, a CPU.

The control unit 202 controls various functions of the portable terminal 200 by executing software procedures according to programs stored in the memory 204.

The control unit 202 realizes an information creation unit 232 as a functional unit.

The memory 204 is, for example, a RAM and/or ROM.

The memory 204 stores various kinds of information (programs and the like) used for controlling the portable terminal 200.

The operation unit 206 is composed of a numeric keypad and function keys, and serves as an interface for input of operation contents from a passer-by.

The display unit 207 is composed of, for example, a LCD (liquid crystal display), PDP (plasma display panel), or EL (electroluminescence) display.

The display unit 207 displays images according to image signals output from the control unit 202.

The wireless communication unit 208 is configured with, for example, a radio frequency (RF) circuit or baseband (BB) circuit.

The wireless communication unit 208 transmits/receives radio signals via the antenna 210.

Furthermore, the wireless communication unit 208 encodes and modulates transmission signals and demodulates and decodes reception signals.

The lens 212 is composed of a zoom lens and a focusing lens.

The lens 212 is derived by a not-shown drive unit based on a zoom control operation from the operation unit 206 and focusing control by the control unit 202. By driving the lens 212, the operation unit 206 and control unit 202 control the field angle and optical image for the image capturing unit 214 to capture an image.

The image capturing unit 214 comprises multiple light receiving elements arranged regularly in a two-dimensional array.

The light receiving elements form an imaging device such as a CCD (charge coupled device) and CMOS (complementary metal oxide semiconductor).

The image capturing unit 214 captures an optical image (receives light) entered via the lens 212 with an image-capturing field angle within a given range based on control signals from the control unit 202, and converts the image signals (light) within the image-capturing field angle to digital data to create a frame.

Furthermore, the image capturing unit 214 captures an image and creates a frame in a temporally successive manner, and outputs the successive frames to the image processing unit 216. Furthermore, the image capturing unit 214 successively stores the frames in the buffer 218 and further updates the stored frames.

Furthermore, the image capturing unit 214 detects pulsed light output from the light emitting unit 114 in the captured images. More specifically, the image capturing unit 214 first determines the luminance at the same coordinates (given coordinates) in each of the frames created within a given time. As a results of the determination, if there is such significant change in the luminance at given coordinates within the image-capturing field angle that the luminance is of a first given value or higher in some frames and of a second given value or lower in other frames, the given coordinates are determined to be the coordinates of a blinking point (where the light emitting unit 114 emits pulsed light). The above process is executed for each point on the frame as given coordinates and it is determined whether there is a point where the pulsed light is received (a blinking point).

If there is a blinking point, the image capturing unit 214 stores in a coordinates data list formed in the buffer 218 the coordinates of the blinking point in the frame (the "bright spot coordinates") and a bit date string presenting the mode of temporal change in the luminance at the bright spot coordinates between frames within a given time (in which, for example, "1" indicates that the light is on and "0" indicates that the light is off). Furthermore, the image capturing unit 214 updates the coordinates data list based on the coordinates and bit data string detected from new frames.

The image processing unit 216 adjusts the image quality and size for the display unit 207 to display a frame (digital data) output from the image capturing unit 214 as a through-the-lens image based on control signals from the control unit 202. Then, the image processing unit 216 allows the display unit 207 to display the adjusted image.

Furthermore, receiving control signals based on the recording order operation from the operation unit 206, the image processing unit 216 files an optical image within the image-capturing field angle of the image capturing unit 214 at the time of the recording order, or an optical image displayed within the display area of the display unit 207.

Here, the filing format is typically a compression coding format such as JPEG (joint photographic experts group).

The decoding unit 220 decodes the bit data string presenting the mode of change in the luminance stored in the coordinates data list within the buffer 218 to digital data based on control signals from the control unit 202.

The decoding scheme used is a scheme corresponding to the encoding scheme by the encoding/modulation unit 110 of the advertisement display device 100.

The GPS receiver 222 receives signals from a GPS satellite, and measures and acquires the current location (latitude and longitude) of the portable terminal 200 based on the signals.

The direction sensor 224 identifies the orientation of the portable device based on change in the geomagnetism, and based on that, detects the photographing direction of the image capturing unit 214.

The clock 226 successively outputs information indicating the current time to the control unit 202.

Figure 4:
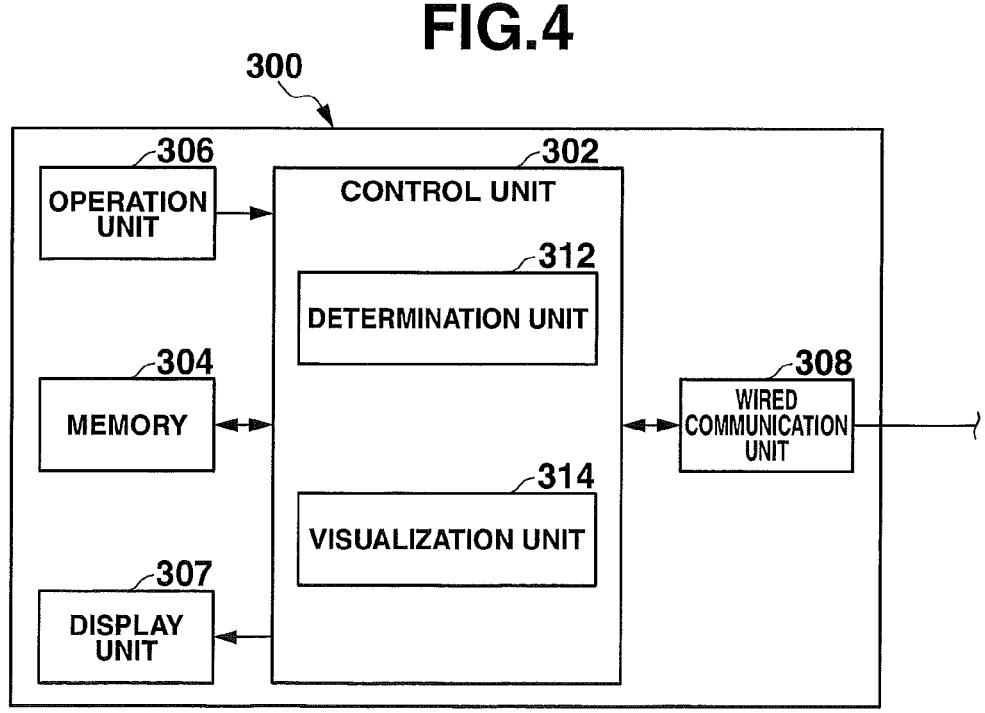
FIG. 4 an illustration showing an exemplary configuration of the server according to the embodiment of the present invention.

Detailed configuration of the server 300 will be described hereafter. As shown in FIG. 4, the server 300 includes a control unit 302, a memory 304, an operation unit 306, and a wired communication unit 308.

The control unit 302 is composed of, for example, a CPU.

The control unit 302 controls various functions of the server 300 by executing software procedures according to programs stored in the memory 304.

The control unit 302 realizes a determination unit 312 and a visualization unit 314 as functional units. The memory 304 is, for example, a RAM and/or ROM.

The memory 304 stores various kinds of information (programs and the like) used for controlling the server 300.

The operation unit 306 is composed of a numeric keypad and function keys, and serves as an interface for input of operation contents from the passers-by 400.

The display unit 307 is composed of, for example, a LCD, PDP, or EL display.

The display unit 307 displays images according to image signals output from the control unit 302.

The wired communication unit 308 is, for example, a LAN card. The wired communication unit 308 communicates with the advertisement display device 100 and portable terminals 200 via the communication network 500.

Operation of the advertising effect measuring system 1 will be described hereafter.

As shown in FIG. 5, the server 300 sends outdoor advertising image data and an advertisement ID upon reception of operation to order display of an advertisement or upon power-on.

The advertisement display device 100 receives the outdoor advertising image data and advertisement ID (Step S100).

In the step S100, the control unit 302 of the server 300 reads the data for an outdoor advertising image to be displayed by the advertisement display device 100 and an advertisement ID that is identification information of the outdoor advertising image from the memory 304.

The control unit 302 outputs the outdoor advertising image data and advertisement ID to the wired communication unit 308 and outputs the IP (Internet protocol) address and MAC (media access control) address corresponding to the advertisement display device 100 to the wired communication unit 308.

The wired communication unit 308 sends the outdoor advertising image data and advertisement ID using the IP address and MAC address corresponding to the advertisement display device 100, as the destination.

The wired communication unit 107 of the advertisement display device 100 receives the outdoor advertising image data and advertisement ID destined for the IP address and MAC address corresponding to the advertisement display device 100 and outputs them to the control unit 102.

Then, the advertisement display device 100 displays the outdoor advertising image based on the received outdoor advertising image data (Step S101).

In the Step S101, the control unit 102 of the advertisement display device 100 generates image signals based on the outdoor advertising image data output from the wired communication unit 107 and outputs the image signals to the display unit 108.

The display unit 108 displays the outdoor advertising image according to the image signals output from the control unit 102.

Then, the advertisement display device 100 emits pulsed light (advertisement ID light) modulated according to the received advertisement ID changing the luminance temporally.

If the outdoor advertising image is located within the observable distance range (in other word, if the advertisement display device 100 is included in the photographing range of the image capturing unit 214), the portable terminal 200 receives the advertisement ID light (Step S102).

In the Step S102, the control unit 102 of the advertisement display device 100 outputs the advertisement ID that is digital data to the encoding/modulation unit 110.

The encoding/modulation unit 110 encodes the advertisement ID output from the control unit 102 to create a bit data string, and modulates the bit data string to the modulated signal.

The drive unit 112 generates drive signals corresponding to the modulated signal output from the encoding/modulation unit 110 and used for temporally changing the luminance of light emitted by the light emitting unit 114.

The light emitting unit 114 emits pulsed light (advertisement ID light) on which the advertisement ID is superimposed according to the drive signals output from the drive unit 112.

On the other hand, in Step S103, the image capturing unit 214 of the portable terminal 200 captures an optical image including the outdoor advertising image and advertisement ID light, and converts the image signals within the photographing field angle to digital data to create a frame.

Furthermore, the image capturing unit 214 captures an image and creates a frame in a temporally successive manner and outputs the successive frames to the image processing unit 216. Furthermore, the image capturing unit 214 successively stores the frames in the buffer 218, and updates the stored frames.

Then, the portable terminal 200 acquires the advertisement ID from the advertisement ID light (Step S103).

In the Step S103, the image capturing unit 214 of the portable terminal 200 detects coordinates of a blinking point in the frames in a given time. Then, the image capturing unit 214 stores the coordinates of the detected blinking point (bright spot coordinates) and a bit data string presenting the mode of temporal change in the luminance at the bright spot coordinates in a given time in the coordinates data list within the buffer 218. Furthermore, the image capturing unit 214 updates the coordinates data list based on the coordinates and bit data string detected in new frames.

Furthermore, the decoding unit 220 decodes the bit data string presenting the mode of change in the luminance stored in the coordinates data list within the buffer 218 to acquire the advertisement ID and outputs it to the control unit 202. The information creation unit 232 of the control unit 202 acquires the advertisement ID from the decoding unit 220.

Then, the portable terminal 200 acquires the current location of the portable terminal 200, the photographing direction from the portable terminal 200 to the advertisement display device 100, and the current time (Step S104).

In the Step S104, the GPS receiver 222 of the portable terminal 200 measures the current location (latitude and longitude) of the portable terminal 200 based on signals from a GPS satellite and outputs it to the control unit 202.

The direction sensor 224 measures the orientation of the portable terminal 200 based on change in the geomagnetism and/or the like. Then, the direction sensor 224 detects the photographing direction of the image capturing unit 214 from the measured orientation, and outputs it to the control unit 202. In this embodiment, the image capturing unit 214 is fixed on the portable terminal 200 and the orientation of the portable terminal 200 is equal to the photographing direction of the image capturing unit 214.

Here, if the outdoor advertising image is located within the observable distance range (in other word, if the advertisement display device 100 is included in the photographing range of the image capturing unit 214), the photographing direction of the image capturing unit 214 indicates the direction from the portable terminal 200 to the advertisement display device 100.

The clock 226 outputs information indicating the current time to the control unit 202. The information creation unit 232 of the control unit 202 acquires the current location (latitude and longitude) of the portable terminal 200, the photographing direction of the image capturing unit 214, and the current time.

Then, the portable terminal 200 creates advertisement recognition information 240 (Step S105).

In the Step S105, the information creation unit 232 of the control unit 202 of the portable terminal 200 creates advertisement recognition information 240 including, as shown in FIG. 6, the acquired advertisement ID 241, acquisition time (current time 242), latitude 243 and longitude 244 of the current location of the portable terminal 200, direction (photographing direction) 245 from the portable terminal 200 to the advertisement display device 100, and a terminal ID 246 that is identification information for the portable terminal 200 such as a telephone number.

Then, the portable terminal 200 sends the advertisement recognition information 240 to the server 300. The server 300 receives the advertisement recognition information 240 (Step S106).

In the Step S106, the control unit 202 of the portable terminal 200 outputs the advertisement recognition information 240 to the wireless communication unit 208 and outputs the IP address and MAC address corresponding to the server 300 to the wireless communication unit 208.

The wireless communication unit 208 encodes and modulates the advertisement recognition information 240 destined for the IP address and MAC address corresponding to the server 300 and sends the radio signals via the antenna 210.

The wired communication unit 308 of the server 300 receives the advertisement recognition information 240 destined for the IP address and MAC address corresponding to the server 300 via the wireless base station 600 and communication network 500.

Furthermore, the wired communication unit 308 outputs the advertisement recognition information 240 to the control unit 302.

Then, the server 300 aggregates the advertisement recognition information 240 received from the portable terminals 200 for each advertisement and for each time window (for example, every two hours) (Step S107). Time window may arbitrarily be determined depending on a setting operation by a user.

In the Step S107, the determination unit 312 of the control unit 302 of the server 300 acquires the advertisement recognition information 240 output from the wired communication unit 308.

Figures 7, 8:
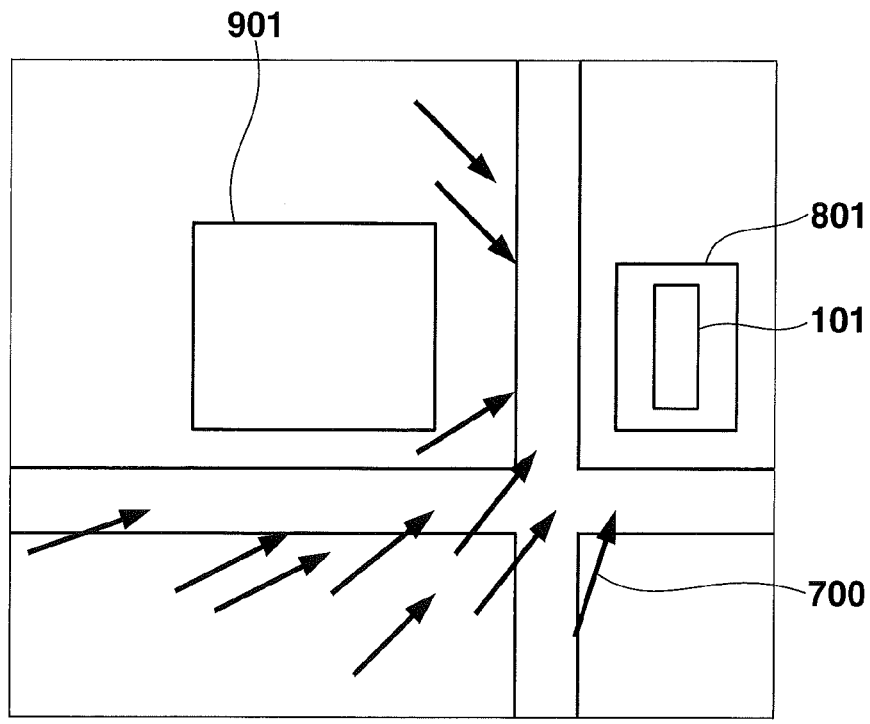
FIG. 7 is an illustration showing exemplary advertising effect information according to the embodiment of the present invention.
FIG. 8 is an illustration showing exemplary visualization results according to the embodiment of the present invention.

Acquiring multiple pieces of advertisement recognition information 240, the determination unit 312 aggregates the advertisement recognition information 240 for each outdoor advertising image and for each time window based on the advertisement ID and time included in the advertisement recognition information 240, and creates advertising effect information as shown in FIG. 7.

The advertising effect information is information indicating where and when in a given time window a passer-by 400 having which portable terminal 200 saw the corresponding outdoor advertising image and information indicating the attained (transmission) range of the corresponding outdoor advertising image as an advertising effect.

Then, the server 300 executes a process to visualize the advertising effect based on the advertising effect information (Step S108).

In the Step S108, the visualization unit 314 of the control unit 302 of the server 300 creates visualization data that allows the user to acknowledge the location and direction at and in which a passer-by 400 observed the corresponding outdoor advertising image in a given time window based on the latitude, longitude, and direction included in the advertising effect information.

The memory 304 associates and stores the advertisement ID of the outdoor advertising image and the location (latitude and longitude) of the advertisement display device 100 displaying the outdoor advertising image.

The visualization unit 314 reads the location of the advertisement display device 100 associated with the advertisement ID included in the advertising effect information stored in the memory 304.

Furthermore, the memory 304 stores map data.

The visualization unit 314 reads the map data on the memory 304 corresponding to a given range including the location of the advertisement display device 100, and draws a map image based on the map image data.

Furthermore, the visualization unit 314 draws, on the map image, an image of an arrow starting from the location where the passer-by 400 of the portable terminal 200 saw and extending in the direction from the portable terminal 200 to the advertisement display device 100.

The visualization unit 314 outputs image signals for the map image and arrow image to the display unit 307.

The display unit 307 displays the map image on which the arrow image is superimposed according to the image signals.

For example, in FIG. 8, the map image includes an image 101 corresponding to the advertisement display device 100, an image 801 corresponding to the building 800, and an image 901 corresponding to the building 900.

Furthermore, arrow images 700 superimposed on the map image are displayed.

With the above visualization process based on the advertising effect information, the person who determines the advertising effect can easily acknowledge the effect of the outdoor advertising image such as from where, in which direction, and how many people saw the outdoor advertising image.

As described above, in the advertising effect measuring system 1 of this embodiment, the advertisement display device 100 displays an outdoor advertising image and emits pulsed light (advertisement ID light) modulated in accordance with the advertisement ID changing the luminance temporally in the same direction as the display direction of the outdoor advertising image.

Receiving the advertisement ID light, the portable terminal 200 demodulates and decodes it to acquire the advertisement ID. Then, the portable terminal 200 sends advertisement recognition information including the advertisement ID, time, location of the portable terminal 200, direction from the portable terminal 200 to the advertisement display device 100, and terminal ID to the server 300.

The server 300 aggregates the advertisement recognition information for each advertisement and for each time window, and creates advertising effect information.

The viewable range of the outdoor advertising image and the attained (transmission) range of the advertisement ID light emitted by the light emitting unit 114 are equal. Therefore, the advertising effect information is information properly indicating where and when in a given time window a passer-by 400 having which portable terminal 200 saw the corresponding outdoor advertising image, namely the effect of the corresponding outdoor advertising image.

Hence, the effect of an outdoor advertising image can properly be measured regardless of the targeted range of the outdoor advertising image.

Here, in the above-described embodiment, the portable terminal 200 acquires the time and the direction from the portable terminal 200 to the advertisement display device 100. However, the portable terminal 200 does not need to acquire them.

In such a case, the advertisement recognition information excludes the time and the direction from the portable terminal 200 to the advertisement display device 100. The advertisement recognition information is information that is not created in each time window and does not include the direction from the portable terminal 200 to the advertisement display device 100.

Furthermore, in the above-described embodiment, the light emitting unit 114 emits pulsed light changing the luminance temporally in accordance with the advertisement ID. Optical signals conveying the advertisement ID is not restricted thereto and the light emitting unit 114 can emit light changing the wavelength or color temporally in accordance with the advertisement ID to propagate the advertisement ID.

Furthermore, information with which the outdoor advertising image is identifiable is not limited to the advertisement ID. For example, when the advertisement display device 100 displays only one outdoor advertising image, identification information of the advertisement display device 100 can be used instead of the advertisement ID.

Furthermore, in the above-described embodiment, the light emitting unit 114 is provided in a partial area of the display unit 108. However, the light emitting unit 114 can be provided outside the display unit 108.

Furthermore, in the above-described embodiment, the outdoor advertising image is an image displayed according to image signals. The outdoor advertising image can be a printed image or photographic image.

Furthermore, in the above-described embodiment, the effect of an outdoor advertising image is measured. The present invention is also applicable to measuring the conveyance effect of visual information other than outdoor advertising images, for example the conveyance range of visual information.

A preferred embodiment of the present invention is described above. The present invention is not restricted to this specific embodiment. The present invention includes the invention set forth in the scope of claims and the scope equivalent thereto.

Having described and illustrated the principles of this application by reference to one (or more) preferred embodiment(s), it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An information conveyance effect measuring system including a visual information conveyance device, a mobile terminal device, and an information output device generating and outputting information of an available range of a conveyance effect of visual information, wherein:

the visual information conveyance device comprises:
a display displaying the visual information; and
a light emitter emitting visible light modulated by identification information of the visual information, wherein a range of access of the visible light is a range in which the visual information is visually recognizable, the terminal device comprises:
an imaging device;
a first processor obtaining the identification information by demodulating the visible light when an image based on the visible light is included in an image captured by the imaging device;

a location detector detecting a current location of the terminal device when the image based on the visible light is included in the image captured by the imaging device; and a transmitter transmitting (i) the identification information, which is obtained by the first processor, and (ii) current location information, which indicates the current location of the terminal device detected by the location detector, to the information output device, and the information output device comprises:

a storage storing location information of the display;

an information receiver receiving the identification information and the current location information transmitted by the transmitter; and a second processor generating and outputting the information of the available range, relative to a location of the display, of the conveyance effect of the visual information displayed by the display, based on the location information stored in the storage and the identification information and the current location information received by the information receiver.

2. The information conveyance effect measuring system according to claim 1, wherein the information generated and output by the information output device is information of an attained range of the visual information.

3. The information conveyance effect measuring system according to claim 1, wherein:

the terminal device further comprises a time acquirer acquiring a time at which the identification information is obtained by the first processor;

the transmitter transmits information of the time acquired by the time acquirer along with the identification information and the location information;

the information receiver receives the information of the time along with the identification information and the location information; and the second processor generates and outputs the information of the available range of the conveyance effect of the visual information for each of a plurality of time windows based on the location information stored in the storage, the identification information, the current location information, and the information of the time.

4. The information conveyance effect measuring system according to claim 1, wherein the light emitter emits the visible light in a same direction as a direction in which the display displays the visual information.

5. An information conveyance effect measuring method of a system including a visual information conveyance device, a mobile terminal device, and an information output device generating and outputting information of an available range of a conveyance effect of visual information, the method comprising:

displaying the visual information on the visual information conveyance device;

emitting, from the visual information conveyance device, visible light modulated by identification information of the visual information, wherein a range of access of the visible light is a range in which the visual information is visually recognizable;

imaging an image by the terminal device;

obtaining, by the terminal device, the identification information by demodulating the visible light when an image based on the visible light is included in the image imaged by the terminal device;

detecting, by the terminal device, a current location of the terminal device when the image based on the visible light is included in the image imaged by the terminal device;

transmitting, by the terminal device, (i) the identification information, which is obtained by the demodulating the visible light, and (ii) current location information, which indicates the detected current location of the terminal device, to the information output device;

receiving, by the information output device, the identification information and the current location information transmitted by the terminal device; and generating and outputting, by the information output device, the information of the available range, relative to a location of the visual information conveyance device, of the conveyance effect of the visual information displayed by the visual information conveyance device, based on stored location information of the visual information conveyance device and the received identification information and the received current location information.

6. An information output device generating and outputting information of an available range of a conveyance effect of visual information, the information output device being a component of an information conveyance effect measuring system which further includes (i) a visual information conveyance device comprising a display displaying the visual information and a light emitter emitting visible light modulated by identification information of the visual information, wherein a range of access of the visible light is a range in which the visual information is visually recognizable, and (ii) a mobile terminal device comprising an imaging device, a first processor obtaining the identification information by demodulating the visible light when an image based on the visible light is included in an image captured by the imaging device, and a location detector detecting a current location of the terminal device when the image based on the visible light is included in the image captured by the imaging device, the terminal device transmitting the identification information, which is obtained by the first processor, and the detected current location of the terminal device, to the information output device, and the information output device comprising:

an information receiver receiving the identification information and the current location of the terminal device transmitted from the terminal device; and a second processor generating and outputting the information of the available range, relative to a location of the display, of the conveyance effect of the visual information displayed by the display, based on location information of the display and the identification information and the current location of the terminal device received by the information receiver.

7. An information output method of generating and outputting information of an available range of a conveyance effect of visual information, the method being performed by an information output device which is a component of an information conveyance effect measuring system, the system further including (i) a visual information conveyance device comprising a display displaying the visual information and a light emitter emitting visible light modulated by identification information of the visual information, wherein a range of access of the visible light is a range in which the visual information is visually recognizable, and (ii) a mobile terminal device comprising an imaging device, a processor obtaining the identification information by demodulating the visible light when an image based on the visible light is included in an image captured by the imaging device, and a location detector detecting a current location of the terminal device when the image based on the visible light is included in the image captured by the imaging device, the terminal device transmitting the identification information, which is obtained by the processor, and the detected current location of the terminal device, to the information output device, and the method comprising:
- receiving the identification information and the current location of the terminal device transmitted from the terminal device; and
- generating and outputting the information of the available range, relative to a location of the display, of the conveyance effect of the visual information displayed by the display, based on location information of the display and the received identification information and the received current location of the terminal device.

8. A non-transitory computer-readable recording medium recording a program thereon which is executable to control a computer to execute a process to generate and output information of an available range of a conveyance effect of visual information in an information conveyance effect measuring system, the system including (i) a visual information conveyance device comprising a display displaying the visual information and a light emitter emitting visible light modulated by identification information of the visual information, wherein a range of access of the visible light is a range in which the visual information is visually recognizable, and (ii) a mobile terminal device comprising an imaging device, a processor obtaining the identification information by demodulating the visible light when an image based on the visible light is included in an image captured by the imaging device, and a location detector detecting a current location of the terminal device when the image based on the visible light is included in the image captured by the imaging device, the terminal device transmitting the identification information, which is obtained by the processor, and the detected current location of the terminal device, to the computer, the program being executable to control the computer to perform functions comprising:
- receiving the identification information and the current location of the terminal device transmitted from the terminal device; and
- a generating and outputting the information of the available range, relative to a location of the display, of the conveyance effect of the visual information displayed by the display, based on location information of the display and the identification information and the current location of the terminal device received by the information receiver.

* * * * *